ELECTRIC PULSE CODE MODULATION SYSTEMS

Filed March 13, 1951 3 Sheets-Sheet 1

Inventor
CYRIL G. TREADWELL
By Philip M. Bolton
Attorney

June 26, 1956 C. G. TREADWELL 2,752,569

ELECTRIC PULSE CODE MODULATION SYSTEMS

Filed March 13, 1951 3 Sheets-Sheet 2

Inventor
CYRIL G. TREADWELL
By Philip M. Bolton
Attorney

June 26, 1956 C. G. TREADWELL 2,752,569

ELECTRIC PULSE CODE MODULATION SYSTEMS

Filed March 13, 1951 3 Sheets-Sheet 3

Inventor
CYRIL G. TREADWELL
By Philip M. Bolton
Attorney

United States Patent Office 2,752,569

Patented June 26, 1956

2,752,569

ELECTRIC PULSE CODE MODULATION SYSTEMS

Cyril Gordon Treadwell, London, England, assignor to International Standard Electric Corporation, New York, N. Y., a corporation of Delaware Application March 13, 1951, Serial No. 215,280

Claims priority, application Great Britain March 21, 1950

2 Claims. (Cl. 332—1)

The present invention relates to electric pulse code modulation systems of communication.

In systems of this kind, the amplitude of the signal wave to be transmitted is sampled at regularly spaced instants, and the value of the amplitude at each instant is measured with respect to a stepped amplitude scale having a limited number of steps. The amplitude value according to this scale is then transmitted to the receiver by pulses according to a code, and the pulses are decoded in the receiver, and the signal wave is re-constituted from the information obtained after decoding.

In practical systems a binary code has generally been used, similar to the five element code commonly used in telegraphy, though the number of units or elements employed is not necessarily five.

When there are $n$ elements to the code, it is possible to transmit $2^n$ different signal amplitudes, and in the form of the binary code most often used, a signal amplitude is proportional to $\Sigma a.2^{(r-1)}$, where $a$ is 1 or 0, and $r$ takes all values from 1 to $n$. The value of $a$ is indicated by the presence or absence of a code pulse in the $r$th code element period. This form of the code has been called the "simple addition" binary code, and it is convenient because the process of reconstituting the signal wave is relatively simple; but in the coding process an effect called "skip-jumping" may occur. In certain types of coding circuit, owing to some slight imperfection in the operation, one of the code pulses may be accidentally missed out (or added when it should be absent). This may result in a large error in the value of the signal amplitude indicated by the code, and appears as noise at the receiving end of the system.

The object of the present invention is to provide a simple coding circuit for the "simple addition" binary code which is inherently not subject to skip jumping.

This object is achieved according to the invention by providing an electric pulse code modulating arrangement for generating a code group of pulses representing a signal voltage according to a binary code of $n$ elements, comprising a device for generating a train of regularly repeated code pulses in response to the application of the said voltage, the said device including a first circuit from which the code pulses present in the code group representing the said voltage are derived, and a second circuit through which the code pulses not present in the code group are diverted, means for positively blocking the second circuit in such manner as to prevent it from transmitting any pulses corresponding to the pulses which are present in the code group, and means for terminating the generatoin of code pulses by the device when it has generated $n$ code pulses.

In order to illustrate the invention clearly, a particular embodiment will be described in which a five element simple addition binary code is employed, and in which particular timing arrangements are adopted. It should be understood, however, that the code may involve more, or less, than five elements, according to the fidelity with which it is desired to reproduce the signal wave, and other timings may be adopted, as may be found suitable. When certain timing relations are important, this will be pointed out.

In the accompanying drawings.

Figure 1:
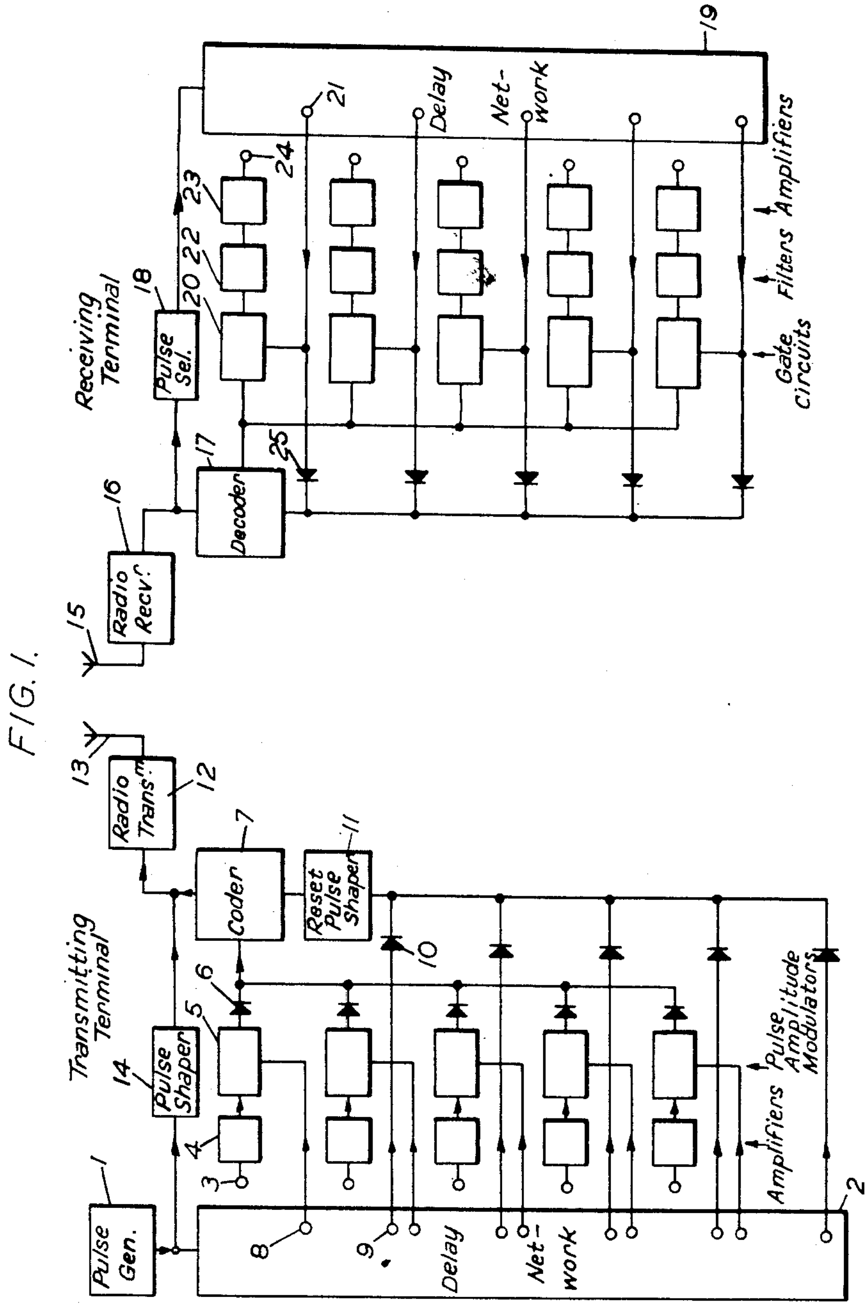
Fig. 1 shows a block schematic circuit diagram of a multi-channel pulse code modulation system of communication in which coding arrangements according to the invention are used.
Figure 2:
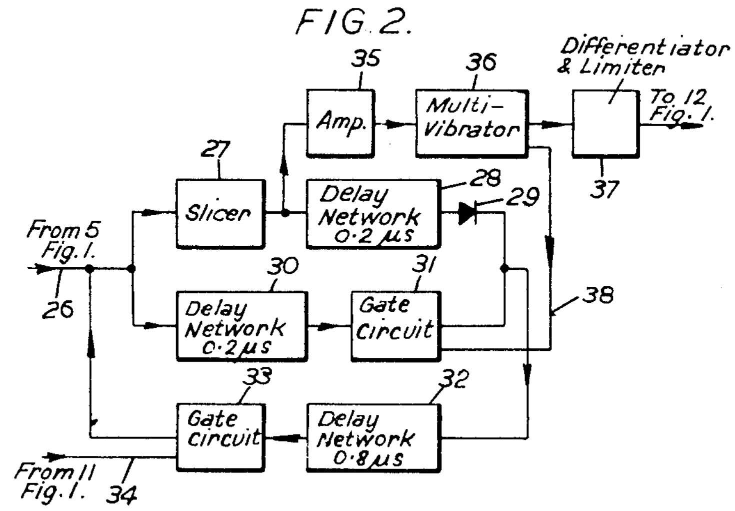
Fig. 2 shows a block schematic diagram of the coder employed in Fig. 1.
Figure 3:
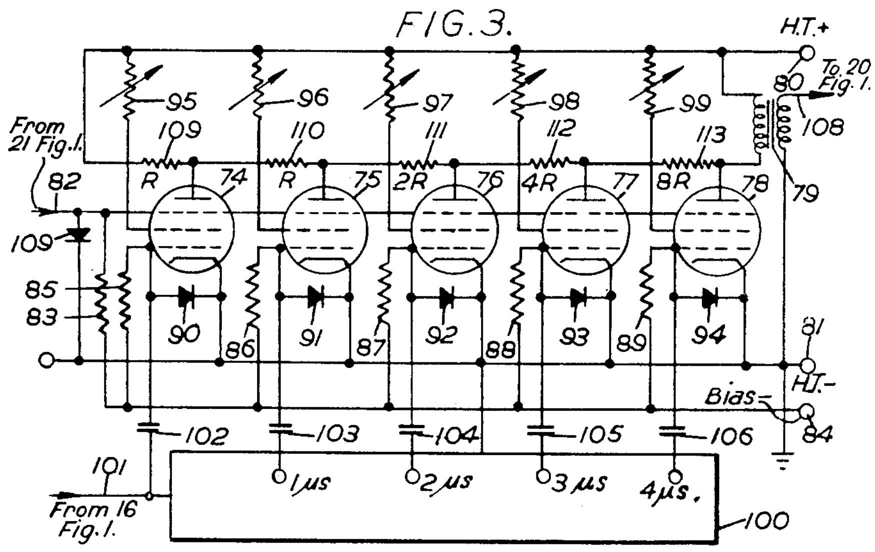
Fig. 3 shows details of the decoder employed in Fig. 1.

The system shown in Fig. 1 is mainly conventional, the features of the invention being concerned with the details of certain elements which are illustrated in Figs. 2 and 3. A five-channel system is illustrated, but it will be evident that the arrangements may be extended in an obvious manner to a system with any member of channels.

The system is controlled by a master pulse generator 1 at the transmitting terminal of the system which generates positive rectangular pulses of duration ½ microsecond, with a repetition frequency of, for example, 10,000 pulses per second. The pulses are supplied to a delay network distributor 2 from which are obtained the pulses required for channel selection in the usual way.

In the case of channel 1, the signal wave to be coded and transmitted is applied at the input terminal 3 to an amplifier 4 and thence to a pulse amplitude modulator 5 of conventional type. The output of the modulator 5 is applied through an isolating rectifier 6 to the input of the coder 7, which is common to all the channels. All the other channels are provided with similar apparatus connected in common to the input of the coder 7.

The modulator 5 may be an ordinary amplifier with a linear amplification characteristic, but biassed so that it is normally blocked. An unblocking pulse of ½ microsecond duration is obtained from an appropriate tap 8 on the delay network 2. Thus at regular instants 100 microseconds apart, the modulator 5 delivers pulses of ½ microsecond duration to the coder, the amplitudes of the pulses being determined by the signal amplitudes at these instants.

The amplifier 4 preferably has a logarithmic amplification characteristic, that is, the output voltage is proportional to the logarithm of the input voltage. This is for the purpose of compressing the signal amplitude in order to improve the signal-to-noise ratio.

As will be explained later, after the coder 7 has produced a code group of pulses corresponding to the amplitude of a channel pulse, it has to be supplied with a negative reset pulse which stops its operation and makes it ready to deal with the next channel pulse. In the case of channel No. 1, this negative reset pulse is obtained from a tap 9 on the delay network 2 somewhat later than the tap 8 and is applied to the coder 7 through an isolating rectifier 10, and a pulse shaper 11 common to all the channels. The shaper 11 is designed to invert the ½ microsecond pulses obtained from the delay network and to lengthen them to about 0.8 microsecond.

In the case of each of the other channels, a reset pulse is obtained in like manner from a tap rather later than the tap from which the corresponding amplitude modulated pulse is obtained, as indicated in Fig. 1.

The pulses produced by the coder 7 may be supplied to a radio transmitter 12 by which they are radiated from an antenna 13 to the receiving terminal, or they might be transmitted thereto over a cable (not shown). Pulses are also obtained directly from the master generator 1, and are lengthened, for example, to 2 microseconds in the shaper 14 to serve as synchronising pulses which are mixed with the code pulses at the output of the coder 7.

At the receiving terminal, the waves are received on the antenna 15 and demodulated in the radio receiver 16. The recovered pulses are applied to the decoder 17 and also to a pulse selector 18 which picks out the 2 microsecond synchronising pulses and reshapes them to a duration of ½ microsecond, and applies them to the delay network distributor 19. The output of the decoder 17 is applied in common to the five channel equipments, which are all similar. The equipment of channel 1 consists of a gating circuit 20 which is opened by a ½ microsecond gating pulse obtained from a tap 21 in the delay network 19 in time to accept an amplitude modulated pulse built up by the decoder 17 from the code pulses. The amplitude modulated pulses which pass through the gate circuit 20 are applied through a low pass filter 22 and an amplifier 23 to the output terminal 24, from which the reconstituted signal wave is obtained. If the signal amplitudes have been compressed in the amplifier 4 at the trasmitter, the amplifier 23 should be designated to introduce a compensating amplitude expansion.

The amplitude modulated pulses built up by the decoder 17 are selected by a multiple gate circuit (not shown in Fig. 1) which is opened by ½ microsecond pulses, to be called trigger pulses, also obtained from terminal 21, which are applied to the decoder through an isolating rectifier 25. All the other receiving channels are similarly equipped.

Details of the coder 7 of Fig. 1 are shown in Fig. 2. The code pulses are generated in a closed delay loop in response to each amplitude modulated pulse from one of the channels. The channel pulse arrives from one of the modulators 5 (Fig. 1) over conductor 26 which is connected to the loop. Part of the loop consists of two parallel branches; the upper branch includes a slicer circuit 27 which may comprise an amplifying valve which is biassed beyond the cut off so that it will not pass any portion of a pulse whose amplitude is less than or equal to a particular value. It will be assumed that the coder is designed to deal with pulse voltages up to a maximum of V, corresponding to 32 steps on the stepped amplitude scale. Then the slicer is designed so that it passes no portion of any pulse unless its amplitude is greater than $V/2$ (16 steps), and also so that the upper portions of pulses of greater amplitude than $V/2$ are amplified so that such upper portions sliced off are exactly doubled in amplitude. The slicer 27 is followed by a delay network 28 which introduces a small delay, such as 0.2 microsecond, and by an isolating rectifier 29.

The lower branch comprises a delay network 30 introducing a delay equal to that of the network 28, that is, 0.2 microsecond, followed by a gate circuit 31 which is normally open (that is, unblocked). This gate circuit includes an amplifier designed exactly to double the amplitude of any pulse passing through it.

The common portion of the code pulse generator loop comprises a delay network 32 connected to the outputs of elements 29 and 32. This network should introduce a delay of 0.8 microsecond, and is followed by a gate circuit 33 which is also normally open (that is, unblocked), and should be designed to transmit unchanged the amplitudes of any pulses passing through it. The gate circuit 33 is connected to the inputs of the elements 27 and 30. The reset pulses from the shaper 11 (Fig. 1) are applied over conductor 34 to close the gate when the generation of the code group of pulses is completed, as will be explained later.

The output of the slicer 27 is also connected through an amplifier 35 to a single stroke multi-vibrator 36 which is designed to generate a single pulse of duration 0.8 microsecond in response to each ½ microsecond pulse from the slicer 27. As is well known, if the multivibrator 36 consists of a conventional arrangement of two cross-connected valves, it is possible to derive both a positive and a negative output pulse from suitable points in the circuit. The positive output pulse is applied to a differentiater and limiter circuit 37 designed to differentiate the positive output pulse and to suppress the negative differentiated pulse corresponding to the trailing edge of the output pulse which may conveniently be of about ½ microsecond duration, is supplied to the radio transmitter 12 (Fig. 1).

The negative output pulse from the multivibrator 36 is applied over conductor 38 to shut the gate 21 thus preventing a pulse from passing through the lower branch. It will be clear, therefore, that if a pulse arrives at the input of the two parallel branches, and has an amplitude greater than 16 units, it passes through the slicer 27 in the upper branch, and in so doing it shuts the lower branch. If the amplitude of the pulse is equal to or less than 16 units, it cannot pass through the slicer 27, and is then permitted to pass through the lower branch. Thus by this arrangement it is impossible for a pulse to pass through both branches simultaneously, and it is this feature which renders the coder free from skip jumping.

The delay network 30 is introduced to make sure that the pulse which shuts the gate circuit 31 will be present before any portion of the input pulse can arrive at the gate circuit. The network 28 is introduced to provide a corresponding delay for pulses passing over the upper branch of the loop. The delay network 32 makes up to 1 microsecond the total delay suffered by any pulse making a complete circuit of the loop.

Figure 4:
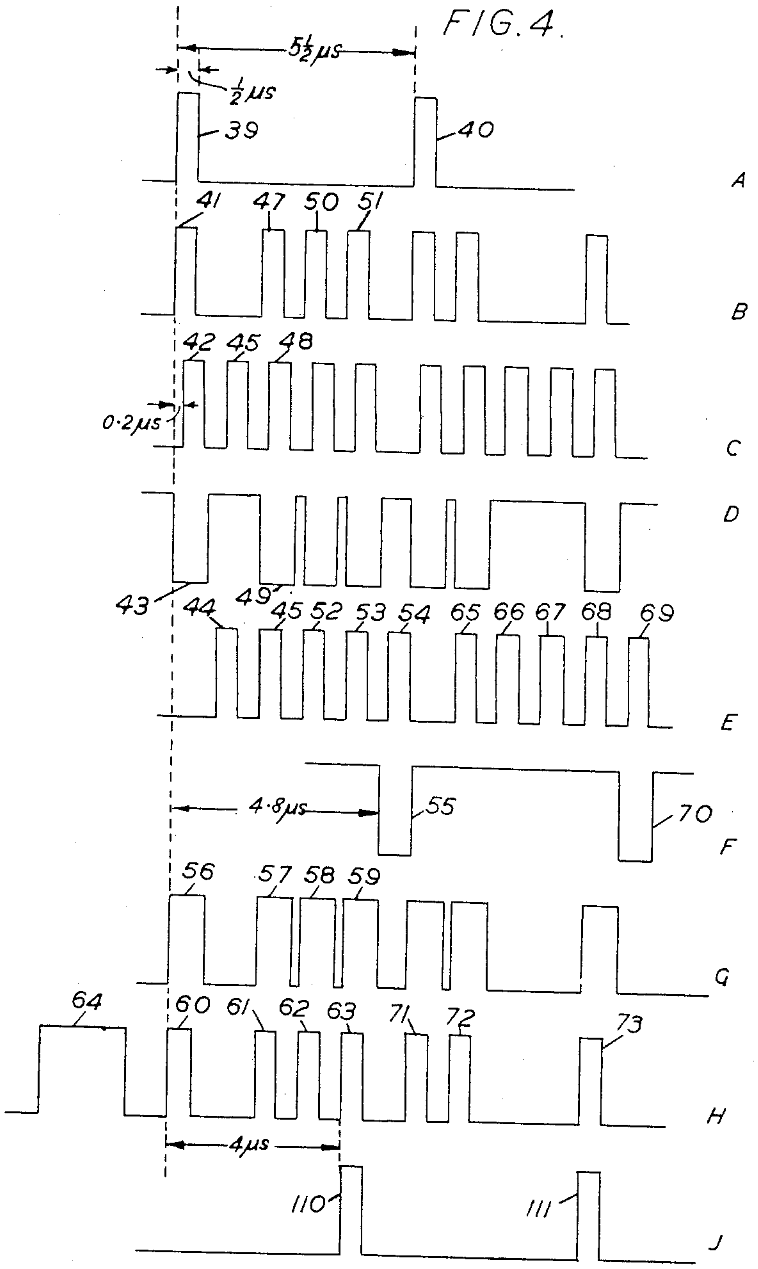
Fig. 4 shows pulse diagrams used in explaining the operation of the system.

In order to make clear the operation of Fig. 2, the pulse diagrams of Fig. 4 have been provided. In these diagrams only the timing of the pulses is indicated, and not their amplitudes.

In graph A, 39 and 40 represent two channel pulses corresponding respectively to channels 1 and 2, arriving over conductor 26, Fig. 2. Each pulse is assumed to have a duration of ½ microsecond; and they are assumed to be spaced apart by 5½ microseconds. It will be assumed for clearness that the amplitude of pulse 39 is 23.3 steps and that of pulse 40 is 25.2 steps.

The pulse 39 being of greater amplitude than 16 steps, passes through the slicer 27 and a corresponding output code pulse 41 appears, as shown by graph B, which shows the pulses which are applied to the amplifier 35.

The pulse 39 also appears at the input of the gate circuit 31 after a delay of 0.2 microsecond, as indicated by the pulse 42, graph C, Fig. 4. However, a negative pulse 43, graph D, has in the meanwhile been generated by the multivibrator 36 and has shut the gate 31, thus preventing the pulse 42 from passing.

The pulse 39 will have had 16 steps cut off it by the slicer 27 and the remainder (7.3 steps) will have been doubled by the slicer, and will re-appear at the input of the slicer over elements 28, 29, 32 and 33 after a total delay of 1 microsecond with an amplitude of 14.6 steps, as shown at 44, graph E. It cannot get through the slicer 27, and arrives 0.2 microsecond later at the gate circuit 31, as indicated at 45, graph C. It is now able to pass, since now no gating pulse is generated by the multivibrator 36. It therefore re-appears with its amplitude doubled after a total delay of 1 microsecond. The doubled amplitude being 29.2 steps, it appears at the output of the slicer 27 as indicated at 47, graph B. The pulse 46 also appears at the input of the gate circuit 31 after a delay of 0.2 microsecond, as indicated at 48, graph C, but is prevented from passing by the gating pulse 49, graph D, from the multivibrator 36. The process continues in the manner explained, two more code pulses 50 and 51 being generated at the output of the slicer 27. Corresponding pulses 52, 53, 54, graph E, appear at the input to the gate circuit 33, but at the time when pulse 54 appears, a reset pulse 55, graph F, arrives over conductor 34 and shuts the gate so that the pulse 54 is blocked, and the generation of code pulses is terminated.

The operation is summarised in the following Table I.

*Table I*

| Pulse | Amplitude Steps | Passes 27 | Passes 31 | New Amplitude Steps | Code pulse |
|---|---|---|---|---|---|
| 39 | 23.3 | Yes | No | 2(23.3-16)=14.6 | X |
| 44 | 14.6 | No | Yes | 2(14.6)=29.2 | 0 |
| 46 | 29.2 | Yes | No | 2(29.2-16)=26.4 | X |
| 52 | 26.4 | Yes | No | 2(26.4-16)=20.8 | X |
| 53 | 20.8 | Yes | No | 2(20.8-16)=9.6 | X |
| 54 | 9.6 | | | Blocked | |

In the last column of this table, X indicates that a code pulse is present at the input to the amplifier 35, and 0 indicates that the corresponding code pulse is absent.

In Fig. 4, graph G indicates the positive pulses 56 to 59 of 0.8 microsecond duration generated by the multivibrator 36 in response to the code pulses 41, 47, 50 and 51 of graph B, and graph H represents the corresponding positive differentiated pulses 60 to 63 radiated by the antenna 13 (Fig. 1), preceded by a synchronising pulse 64 of 2 microseconds duration obtained from the shaper 14.

The pulse 40 (graph A) corresponding to channel 2 has been assumed to have an amplitude of 25.2 steps. The circuit operates in the same way as for the pulse 39 and is summarised in Table II as follows:

*Table II*

| Pulse | Amplitude Steps | Passes 27 | Passes 31 | New Amplitude Steps | Code pulse |
|---|---|---|---|---|---|
| 40 | 25.2 | Yes | No | 2(25.2-16)=18.4 | X |
| 65 | 18.4 | Yes | No | 2(18.4-16)=4.8 | X |
| 66 | 4.8 | No | Yes | 2(4.8)=9.6 | 0 |
| 67 | 9.6 | No | Yes | 2(9.6)=19.2 | 0 |
| 68 | 19.2 | Yes | No | 2(19.2-16)=6.4 | X |
| 69 | 6.4 | | | Blocked | |

The pulse 69 (graph E) is blocked by the reset pulse 70 (graph F). In this case three code pulses 71, 72, 73 (graph H) will be radiated in response to the channel pulse 40, while four were radiated in response to the channel pulse 39.

It will be clear that each code group of pulses consists of five pulses or less, of ½ microsecond duration, which if all were present would have ½ microsecond intervals between them. A complete group thus occupies a period of 4½ microseconds.

The interval 5½ microseconds between two adjacent channel pulses has been chosen so that the corresponding groups of code pulses are separated by 1 microsecond. This however is not essential, and an interval of ½ microsecond could have been used, for example. Actually any convenient interval between adjacent code pulse groups might be used.

The leading edge of the pulse 54 (graph E), which must be blocked, will occur 5 microseconds after the leading edge of the corresponding channel pulse 39. Thus the leading adge of the reset pulse 55 should occur about 4.8 microseconds after the leading edge of the channel pulse 39, in order to be established in time for the appearance of the pulse 54. The tap 9 on the delay network 2 (Fig. 1) should therefore be at a point about 4.8 microseconds later than the tap 8.

It has been assumed that there are no delays at any points in the circuits of Figs. 1 and 2 other than those produced by delay networks. It will be understood that small incidental delays will be suitably compensated in well known manner, in order to produce the time relations which have been explained.

Fig. 3 shows details of the decoder 17 of Fig. 1. It comprises five similar pentode valves 74 to 78 corresponding respectively to the five code pulses of the group, and forming a multiple gate circuit. The valves have their cathodes connected to ground, and their anodes currents are supplied through the primary winding of an output transformer 79 from the positive terminal 80 for the high tension source (not shown) the negative terminal 81 of which is connected to ground. The suppressor grids of the valves are all connected together and to an input conductor 82 over which the trigger pulses for operating the decoder are supplied. The conductor 82 is connected to the isolating rectifiers 25 (Fig. 1).

The suppressor grids are also connected through a large resistor 83 to a negative bias source (not shown) connected to terminal 84. The control grids are also connected to this bias source through large resistors 85 to 89 and to the respetcive cathodes through rectifiers 90 to 94. The screen grids are connected to terminal 80 through adjustable load resistors 95 to 99.

A delay network 100 is provided having four tappings at points producing output pulses 1 to 4 microseconds later than the time corresponding to an input pulse supplied over conductor 101, which is connected to the receiver 16, Fig. 1. The control grid of the valve 74 is connected through a blocking capacitor 102 to the conductor 101, and the control grids of the other valves are connected in order to the four tapping points through blocking capacitors 103 to 106 respectively. One end of the secondary winding of the output transformer 79 is connected to ground, and the other end is connected to an output conductor 108 which is connected in common to all the gate circuits 20 of Fig. 1.

The anodes of the valves 74 to 78 are connected, as shown, to corresponding tapping points on a load resistor divided into five sections 109 to 113, the relative resistances of the sections being preferably R, R, 2R, 4R, and 8R, as indicated.

Since the suppressor grids of all the valves are connected to the negative bias source, all the valves will be normally cut off. The pulses applied over conductor 82 should be of sufficient amplitude to bring the suppressor grids at least to ground potential, but the control grid bias should be such as still to block all the valves in the absence of any pulses arriving over conductor 101. The trigger pulse should arrive at conductor 82 at the same time as the fifth pulse of a code group (e. g. 63, Fig. 4, graph H), while at this time $t$ the fourth, third, second, and first code pulses (or those which are present) will have just arrived at the 1, 2, 3 and 4 microsecond taps, respectively, of the delay network 100, and will be applied to the corresponding control grids. That is, all the valves 74 to 78 corresponding to code pulses which are present in the code group will be opened simultaneously.

The resistors 95 to 99 should be adjusted so that when the control grids and suppressor grids of all valves are at cathode potential, the anode currents of the valves 74 to 78 are respectively proportional to 1, 2, 4, 8 and 16 units. The choice of the relative values of the sections of the anode load resistance given above facilitates this adjustment. Thus when the trigger pulse comes in at conductor 82, the total anode current passing through resistance 79 will be proportional to $\Sigma a.2^{(r-1)}$, as determined by the code pulses which are actually present.

The rectifiers 90 to 94 are directed so that they conduct when the control grids are positive to the cathodes, and ensure that, provided that the input pulses are given sufficient amplitude, the control grid potential with respect to the cathode is limited to zero when a pulse is present. Likewise a rectifier 109 connecting the conductor 82 to ground limits the suppressor grid potential to zero, so that the total output current will be independent of the amplitudes of the input pulses provided they are sufficiently great.

It will be clear that in response to each code group of pulses, an output pulse will be obtained having an amplitude which differs from the amplitude of the corresponding input amplitude modulated pulse at the transmitting end by less than 1 step of the amplitude scale.

Graph J, Fig. 4, shows the trigger pulses which operate the decoder 17 (Fig. 1). Pulse 110 represents the trigger pulse corresponding to channel 1, obtained from the tapping 21 on the delay network 19. This pulse should synchronise with the last code pulse 63 (graph H) and its leading edge should therefore occur 4 microseconds after the leading edge of the original amplitude modulated pulse 39 (graph A). Pulse 111 is the trigger pulse for channel 2 and should synchronise with the last code pulse 73. The pulses 110 and 111 also represent the gating pulses which open the gate circuits 20 (Fig. 1) for channels 1 and 2.

It now remains to point out for channel 1, that on the arrival of the trigger pulse 110, the pulses 60, 61, 62 and 63 (graph H) will be applied respectively to the valves 78, 76, 75 and 74 (Fig. 3) so that the amplitude of the output pulse will be proportional to $$16+4+2+1=23$$

while the original pulse 39 was assumed to have an amplitude proportional to 23.3. Likewise, for channel 2, on the arrival of the trigger pulse 111 the pulses 71, 72 and 73 will be applied respectively to the valves 78, 77 and 74, so that the amplitude of the output pulse will be proportional to 16+8+1=25, instead of 25.2 assumed for the pulse 40.

It will be understood that the pulses of the other channels which are not shown in Fig. 4 will be dealt with in the same way as those of channels 1 and 2, and the distribution of the code pulses in each code group will in general be different for each channel and will be determined by the corresponding instantaneous signal amplitude.

In the example of a system which has been used to illustrate the invention, the time occupied by each code group of pulses is 4½ microseconds. It would be quite possible to reduce this time if desired, by reducing the duration of the code pulses, and/or the separation between them.

When the binary code employed comprises other than five elements, the arrangements can obviously be modified accordingly. The interval between two adjacent channel pulses such as 39 and 40, Fig. 4, graph A, should be adjusted to be slightly greater than the period occupied by a code group, and the blocking pulse such as 55, graph F, should be timed to block the pulse generated in the closed loop (Fig. 2) which would otherwise follow the last of the code pulses of the group. The trigger pulse 110, graph J, at the receiver, should synchronise with the reception of the last of the code pulses of the group.

While the principles of the invention have been described above in connection with specific embodiments, and particular modifications thereof, it is to be clearly understood that this description is made only by way of example and not as a limitation on the scope of the invention.

What is claimed is:

1. An electric pulse code modulating arrangement for generating a code group of pulses representing the instantaneous amplitude of a signal wave according to a binary code of $n$ elements, and with reference to a stepped amplitude scale having a specified maximum amplitude, comprising means for generating a signal pulse having the said instantaneous amplitude, a closed code pulse generating loop including a delay device so arranged that if an input pulse be applied at a point in the loop it will return to that point after a given delay, part of the loop consisting of two parallel branches, the first of which passes only pulses having an amplitude exceeding half the specified maximum amplitude and the second of which passes only pulses having an amplitude less than or equal to the specified maximum amplitude, both branches being designed to double the amplitude of any pulses or portions of pulses passed thereby, means for positively blocking one of the branches when a pulse is passed by the other branch, means for applying the signal pulse to the inputs of the said branches, means for interrupting or blocking the closed loop when $n$ pulses have traveled round the loop, and means for deriving the code group of pulses from one of the branches, wherein the first branch includes an amplitude limiting device arranged to subtract half the specified maximum amplitude from the amplitude of each pulse which it passes and to double the amplitude which remains, and in which the second branch includes a gate circuit adapted to be shut by a gating pulse produced in response to each pulse passed by the amplitude limiting device, the gate circuit being also arranged to double the amplitudes of all pulses which are permitted to pass therethrough, and wherein each pulse passed by the amplitude limiting device is applied to operate a single-stroke multivibrator, comprising means for differentiating the pulses generated by the multivibrator and for selecting all the differentiated pulses of one sign to serve as the transmitted code group, and means for applying pulses generated by the multivibrator to serve as gating pulses for shutting the said gate circuit.

2. An arrangement according to claim 1 in which the gating circuit is preceded by a first delay network introducing a delay small compared with the duration of the code pulses, and in which the amplitude limiting device is followed by a second delay network introducing an equal delay.

References Cited in the file of this patent

UNITED STATES PATENTS

| | | |
|---|---|---|
| 2,569,927 | Gloess et al. | Oct. 2, 1951 |
| 2,594,742 | Dickinson | Apr. 29, 1952 |
| 2,609,501 | Guthrie | Sept. 2, 1952 |
| 2,616,965 | Hoeppner | Nov. 4, 1952 |
| 2,617,879 | Sziklai | Nov. 11, 1952 |
| 2,651,716 | Feissel | Sept. 8, 1953 |